United States Patent
Hubbard et al.

(10) Patent No.: US 10,081,518 B2
(45) Date of Patent: Sep. 25, 2018

(54) ELEVATOR MACHINE AND STATOR SUPPORT STRUCTURE

(71) Applicant: OTIS ELEVATOR COMPANY, Farmington, CT (US)

(72) Inventors: James L. Hubbard, Kensington, CT (US); Zlatko Strbuncelj, Avon, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 267 days.

(21) Appl. No.: 14/892,694

(22) PCT Filed: May 22, 2014

(86) PCT No.: PCT/US2014/039134
§ 371 (c)(1),
(2) Date: Nov. 20, 2015

(87) PCT Pub. No.: WO2014/193726
PCT Pub. Date: Dec. 4, 2014

(65) Prior Publication Data
US 2016/0130117 A1    May 12, 2016

Related U.S. Application Data

(60) Provisional application No. 61/827,968, filed on May 28, 2013.

(51) Int. Cl.
*B66B 19/00* (2006.01)
*B66B 11/04* (2006.01)
(Continued)

(52) U.S. Cl.
CPC ........ *B66B 19/005* (2013.01); *B66B 11/0438* (2013.01); *H02K 1/187* (2013.01); *H02K 1/20* (2013.01)

(58) Field of Classification Search
CPC ... B66B 19/005; B66B 11/0438; H02K 1/187; H02K 1/20
See application file for complete search history.

(56) References Cited

U.S. PATENT DOCUMENTS 5,018,603 A    5/1991    Ito
5,665,944 A    9/1997    Aulanko et al.
(Continued)

FOREIGN PATENT DOCUMENTS

CN    2098492 U    3/1992
CN    1246981 A    3/2000
(Continued)

OTHER PUBLICATIONS

Chinese Office Action for application 201480030223.0, dated Feb. 4, 2017, 9pgs.
(Continued)

*Primary Examiner* — Michael A Riegelman
(74) *Attorney, Agent, or Firm* — Cantor Colburn LLP

(57) ABSTRACT

Embodiments are directed an elevator machine comprising: a stator assembly, and a plurality of support plates coupled to the stator assembly, wherein a respective at least one of the support plates is coupled on each end of the stator assembly and configured to enable the stator assembly to expand radially and axially in a substantially uniform manner over a range of temperatures.

7 Claims, 11 Drawing Sheets

(51) Int. Cl.
H02K 1/18 (2006.01)
H02K 1/20 (2006.01)

(56) References Cited

U.S. PATENT DOCUMENTS

| | | | |
|---|---|---|---|
| 5,899,301 | A | 5/1999 | Aulanko et al. |
| 5,982,060 | A | 11/1999 | Hakala et al. |
| 7,166,946 | B2 | 1/2007 | Gauthier |
| 8,395,289 | B2 * | 3/2013 | Tian .................. H02K 5/18 310/61 |
| 2001/0011617 | A1 | 8/2001 | Hakala |
| 2003/0070881 | A1 | 4/2003 | Nagata et al. |
| 2006/0060428 | A1 | 3/2006 | Hashiguchi |
| 2010/0000075 | A1 * | 1/2010 | Akimoto ............ H02K 15/024 29/596 |
| 2012/0112577 | A1 * | 5/2012 | Strbuncelj .......... B66B 11/0438 310/63 |
| 2012/0267199 | A1 * | 10/2012 | Strbuncelj ............ B66B 11/043 187/250 |
| 2013/0026868 | A1 * | 1/2013 | Klafter .................. H02K 9/06 310/62 |
| 2014/0014443 | A1 * | 1/2014 | Koroki ............... B66B 11/0438 187/276 |
| 2014/0183991 | A1 * | 7/2014 | Kulkarni ................ H02K 5/20 310/59 |
| 2016/0101966 | A1 * | 4/2016 | Strbuncelj .......... B66B 11/0438 187/254 |
| 2016/0126810 | A1 * | 5/2016 | Hubbard ................ H02K 9/22 187/254 |
| 2016/0130117 | A1 | 5/2016 | Hubbard et al. |
| 2016/0251203 | A1 * | 9/2016 | Strbuncelj ................ H02K 1/20 187/254 |
| 2016/0340152 | A1 * | 11/2016 | Strbuncelj ................ B66B 9/00 |

FOREIGN PATENT DOCUMENTS

| | | |
|---|---|---|
| CN | 1721313 A | 1/2006 |
| CN | 1984833 A | 6/2007 |
| CN | 201928094 U | 8/2011 |
| CN | 102857028 A | 1/2013 |
| DE | 19958545 C1 | 4/2001 |
| EP | 1043261 A2 | 2/2000 |
| EP | 1719731 A1 | 2/2004 |
| EP | 1886962 A1 | 2/2008 |
| EP | 2391569 A1 | 12/2011 |
| JP | 2000191250 A | 7/2000 |
| JP | 2006027803 A | 2/2006 |
| WO | 2012050150 A1 | 4/2012 |

OTHER PUBLICATIONS

Final Office Action for U.S. Appl. No. 14/893,227, dated May 18, 2017, 19pgs.
International Preliminary Report on Patentability for application PCT/US2014/039139, dated Dec. 1, 2015, 6 pgs.
Non Final Office Action for U.S. Appl. No. 14/893,227, dated Dec. 27, 2016, 44 pages.
CN Office Action for application CN 201480030657.0, dated Feb. 8, 2017, 8 pgs.
International Search Report for application PCT/US2014/039134, dated Sep. 2, 2014, 5 pages.
Written Opinion for application PCT/US2014/039134, dated Sep. 2, 2014, 5 pages.
Znidarich, M. M., "Hydro Generator Stator Cores, Part 1—Constructional Features and Core Losses", 2008 Australasian Universities Power Engineering Conference (AUPEC'08), 8 pages.

* cited by examiner ial rotor motor placed next to a traction sheave. FIG. 1 illustrates an example of such a machine 100, with an internal rotor motor 102 next to a traction sheave 104. The machine 100 may be associated with a number of disadvantageous characteristics. For example, the machine 100 may be long or large, may have high mass, and may subject a rotating shaft to fatigue stresses.

FIG. 2 illustrates an example of another machine 200. The machine may address a number of the disadvantages associated with the machine 100. The machine 200 may include an external rotor motor 202 located inside or within an envelope of a traction sheave 204. However, referring to the machine 200, a stator and stator support structure 300 as shown in FIG. 3 are very stiff, which leads to high stresses when the stator thermally expands. As a result, motor reliability and lifetime are reduced or degraded. Also, using the machine 200, there is no space available to move bearings 206 within the envelope of the sheave 204. Thus, much like the machine 100, the machine 200 is quite long or large.

BRIEF SUMMARY

An embodiment is directed to a method for reducing the size of an elevator machine, comprising: constructing a stator assembly, and coupling the stator assembly to at least one support plate configured to enable the stator assembly to expand radially and axially in a substantially uniform manner.

An embodiment is directed to an elevator machine comprising: a stator assembly, and a plurality of support plates coupled to the stator assembly, wherein a respective at least one of the support plates is coupled on each end of the stator assembly and configured to enable the stator assembly to expand radially and axially in a substantially uniform manner over a range of temperatures.

Additional embodiments are described below.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
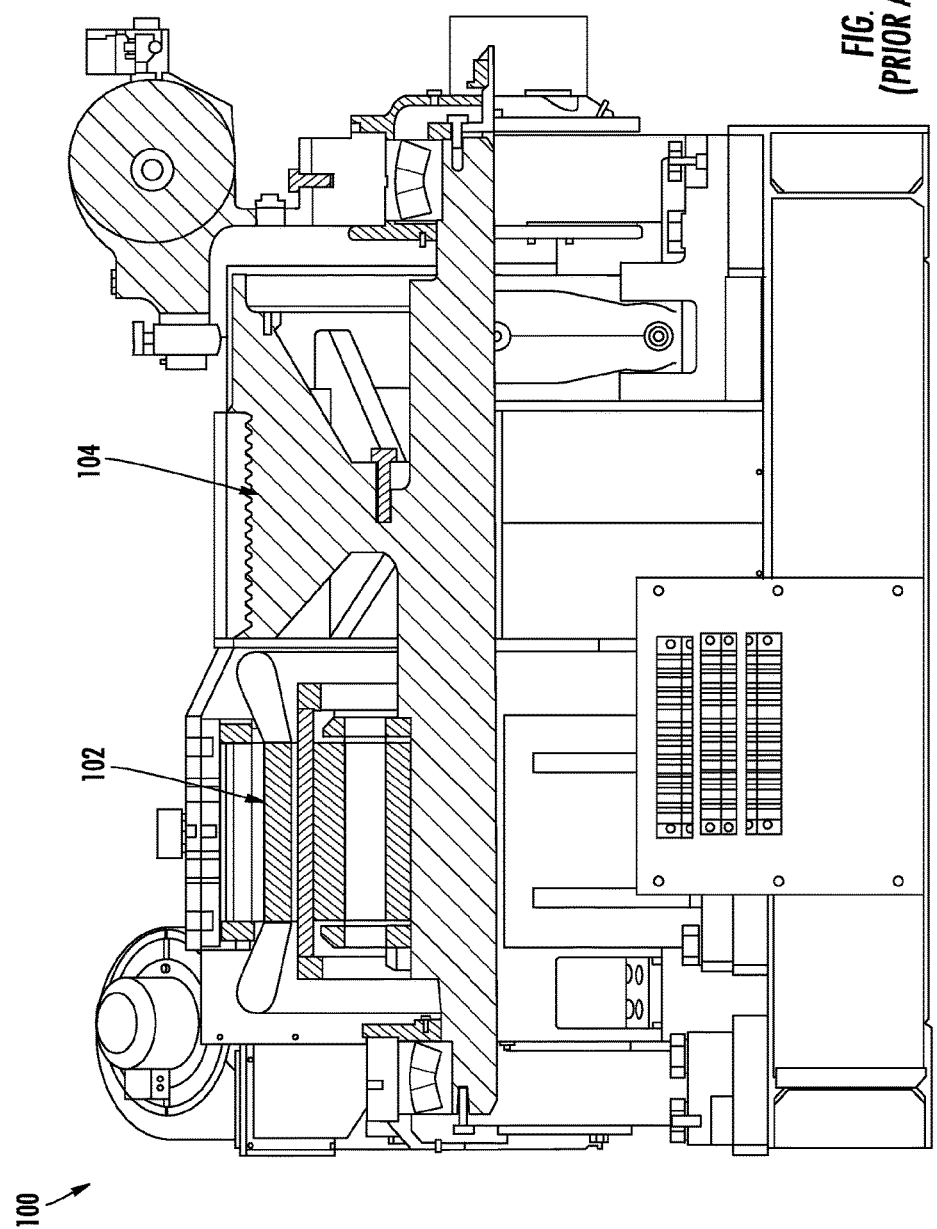
FIG. 1 illustrates an elevator machine in accordance with the prior art.
Figure 2:
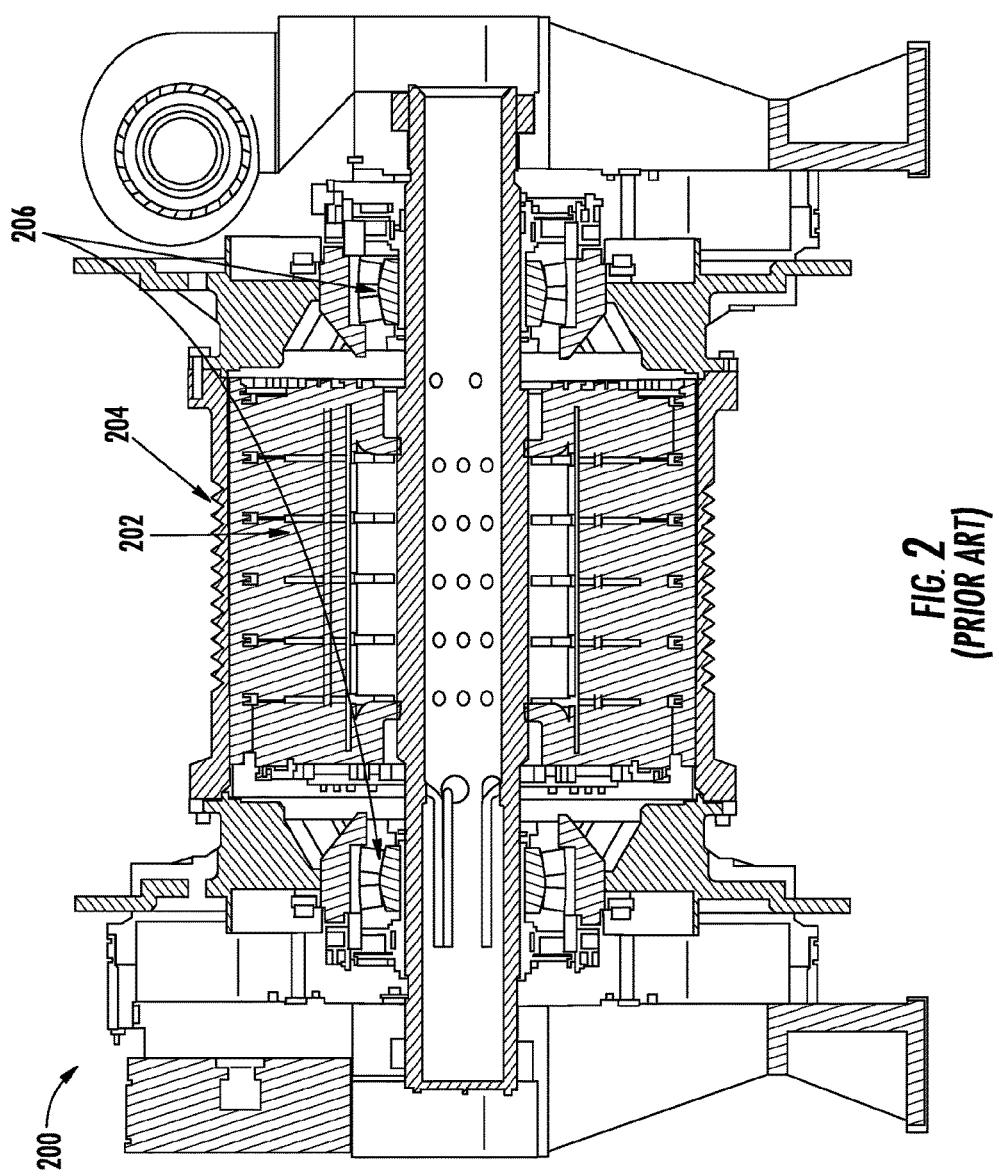
FIG. 2 illustrates an elevator machine in accordance with the prior art.
Figure 3:
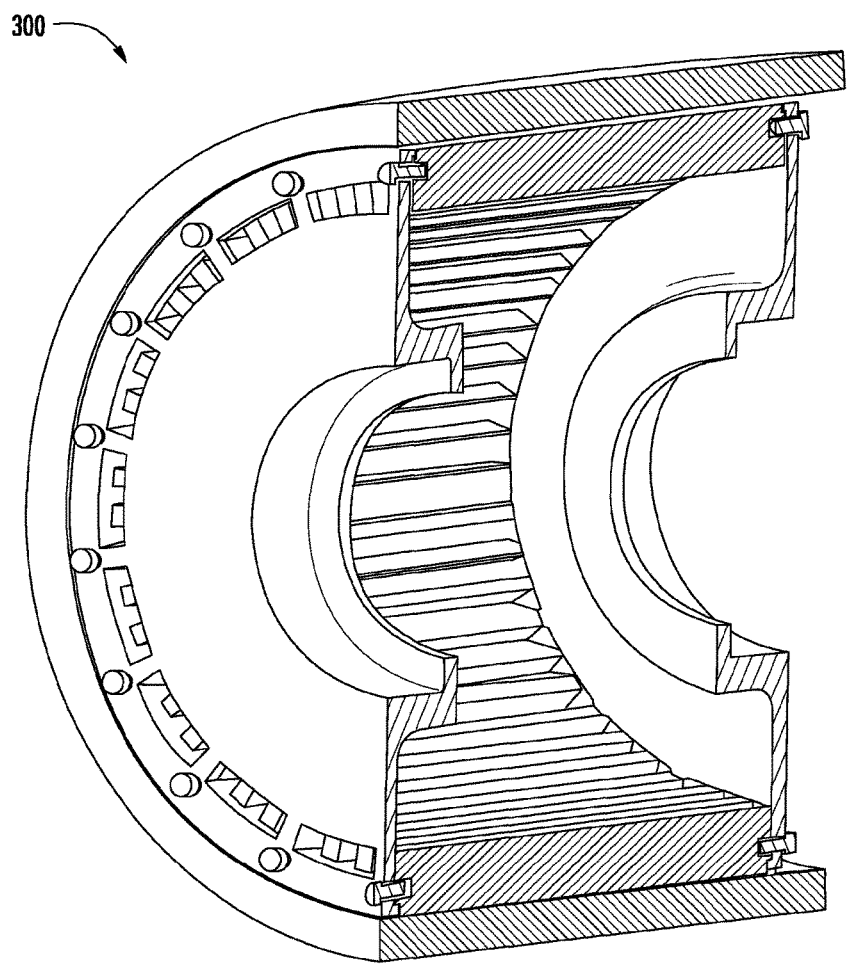
FIG. 3 illustrates a non-flexible stator support structure in accordance with the prior art.

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect. A coupling between entities or components may refer to either a direct or an indirect connection.

Exemplary embodiments of apparatuses, systems and methods are described for reducing the size or length of a machine, such as an elevator machine. In some embodiments, the machine may be configured to allow bearings to be within an envelope of a sheave or stator. In some embodiments, a stator support plate may be of a particular dimension and shape/geometry to allow a stator assembly to expand radially and axially. Such expansion may occur over a range of temperatures in a substantially uniform manner (e.g., with a variation that is less than a threshold) without subjecting stator components to excess stress or strain.

Figure 4:
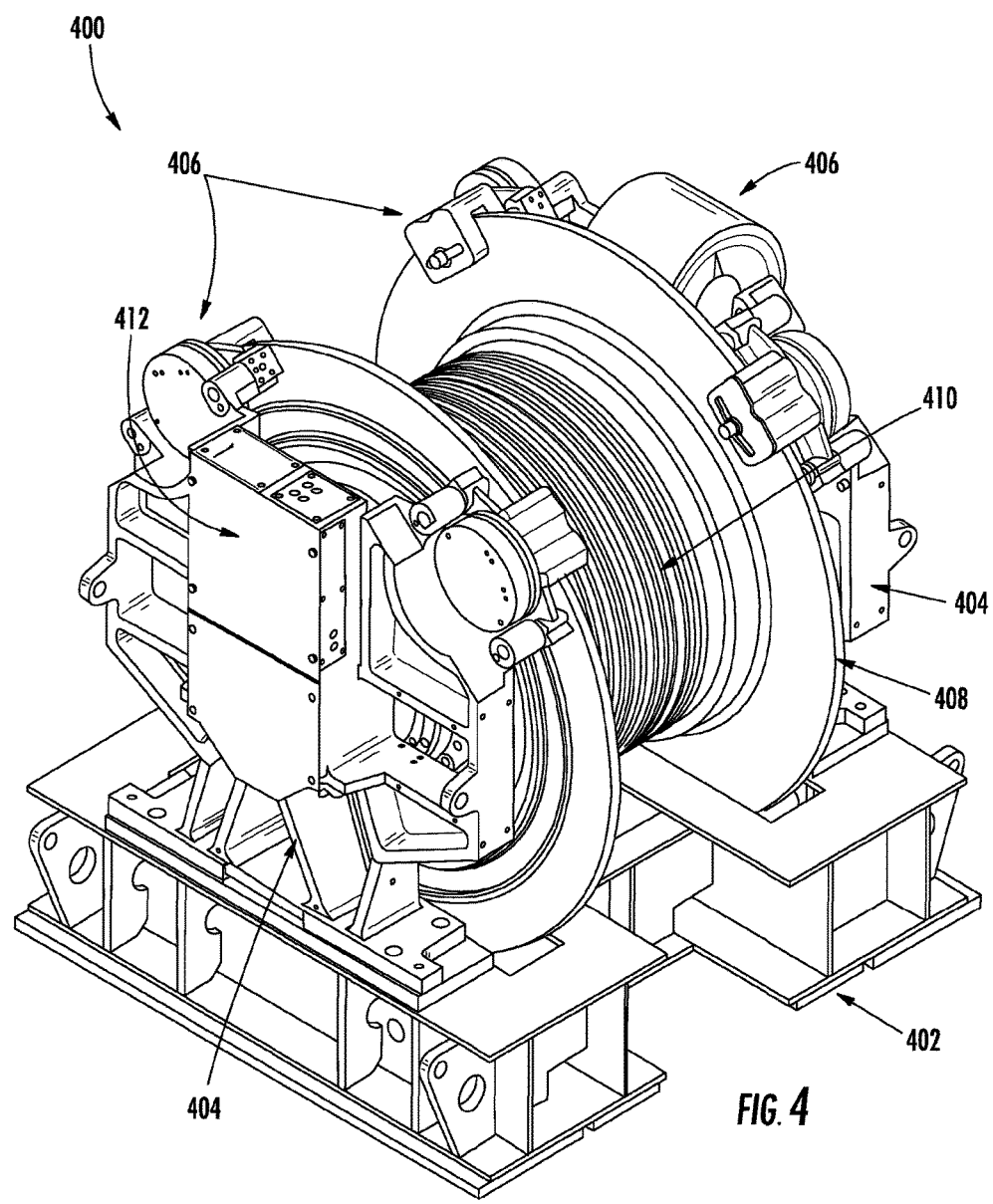
FIG. 4 illustrates an exemplary machine.

FIG. 4 illustrates a layout of an exemplary machine 400 in accordance with one or more embodiments. The organization and arrangement of the various components and devices shown and described below in connection with the elevator system 400 is illustrative. In some embodiments, the components or devices may be arranged in a manner or sequence that is different from what is shown in FIG. 4. In some embodiments, one or more of the devices or components may be optional. In some embodiments, one or more additional components or devices not shown may be included.

The machine 400 may include a bedplate 402. The bedplate 402 may serve as a base or support for the machine 400. The bedplate 402 may support the machine 400 when the machine 400 is installed in, e.g., an elevator system.

The machine 400 may include one or more stands, such as stands 404. The stands 404 may be used to provide support for the machine 400 and may be used to provide a (minimum) clearance with respect to the operative components of the machine 400.

The machine 400 may include one or more brakes 406. The brakes 406 may be selectively coupled to one or more brake discs 408, which may be used to bring an elevator car to a controlled stop.

The machine 400 may include a sheave 410. The sheave 410 may be used to hold or support a rope, a cable, a belt, etc., for purposes of facilitating movement of an elevator car within an elevator system.

The machine 400 may include one or more terminal boxes 412. A terminal box 412 may be arranged on a stationary frame on a side of the sheave 410 and may be used to provide for one or more points of connection (e.g., electrical connection).

Figure 5:
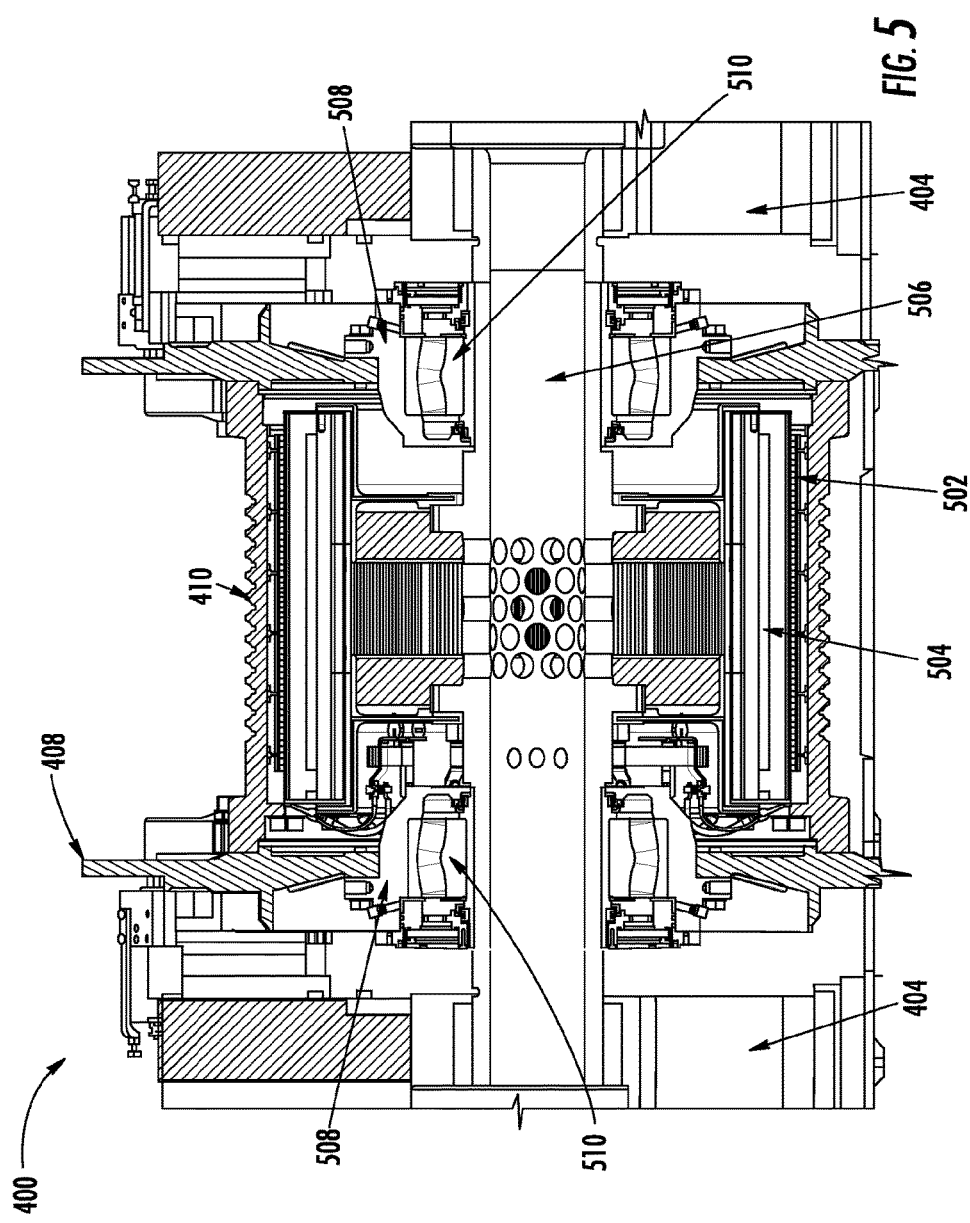
FIG. 5 illustrates a cross-section of the machine of FIG. 4.

Referring now to FIG. 5, a cross-section of the machine 400 is shown. The machine 400 may have a motor, which is illustratively shown in FIG. 5 as being comprised of a rotor 502 and a stator 504. The rotor 502 may be coupled to the sheave 410 that may be used to deliver power (e.g., mechanical power) to drive or move an elevator car. As described further below, the stator 504 may be coupled to a shaft 506, potentially via one or more plates.

As shown in FIG. 5, the machine 400 may include housings 508 that may contain a bearing 510. The bearing 510 may be used to constrain motion in a particular way (e.g., in a particular direction). The bearing 510 may sit on a stationary shaft while a spinning part or component may be attached to the brake disc 408 and through a bolted joint connected to both ends of the sheave 410. In some embodiments, oil maintenance may be performed through ports placed on the housing 508.

Figure 6:
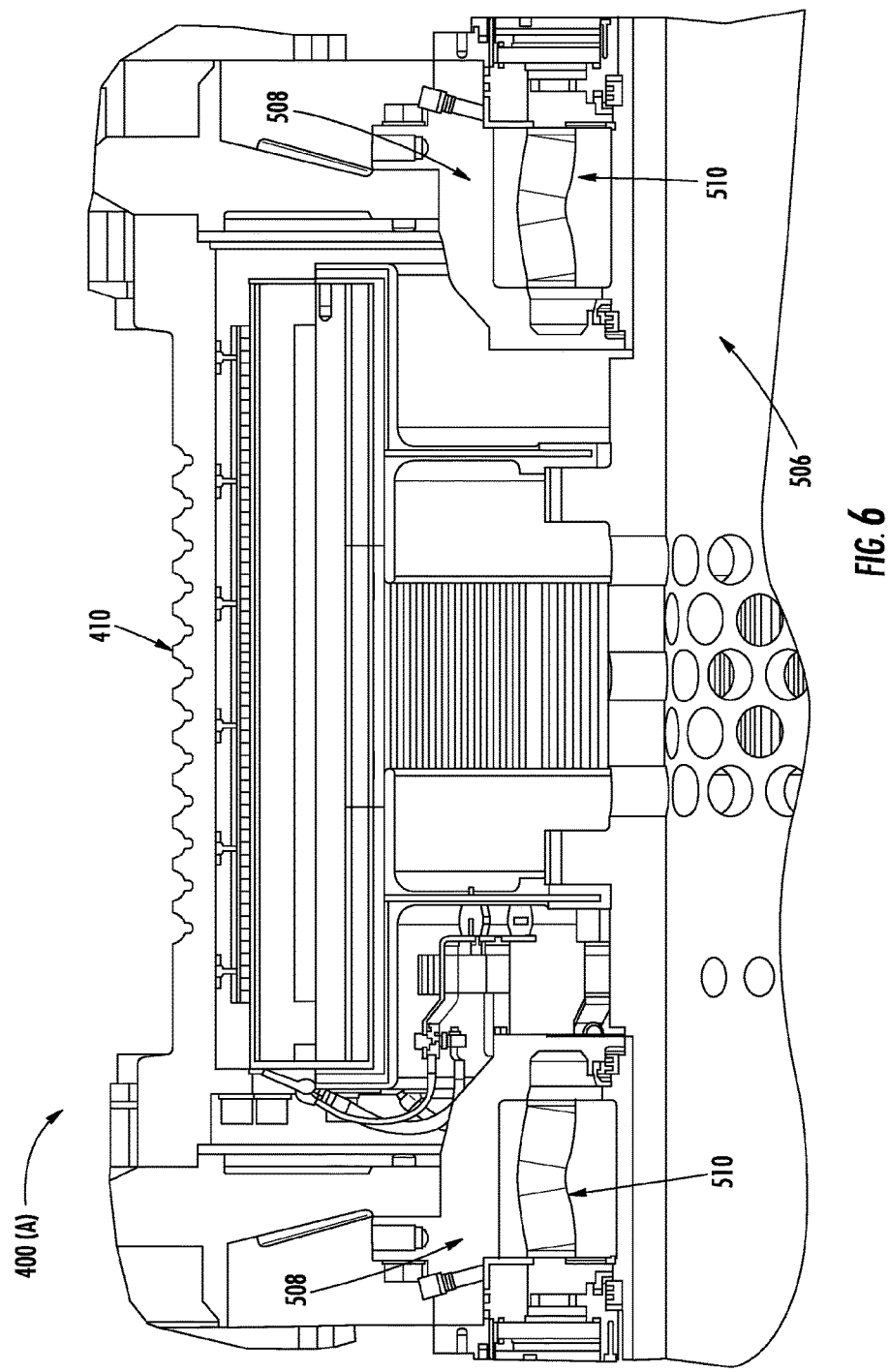
FIG. 6 illustrates a portion of the machine of FIG. 4

A portion of the machine 400 is indicated via an enclosed circle 'A' in FIG. 5. A closer or more detailed view of the portion 'A' is shown in FIG. 6. As shown in FIG. 6, the bearings 510 may be at least partially enclosed within an envelope of the sheave 410. Thus, the machine 400 may be made smaller relative to the machines 100 and 200. For example, partially enclosing the bearings 510 within the envelope of the sheave 410 may facilitate a reduction in the size of the machine 400.

Figure 7:
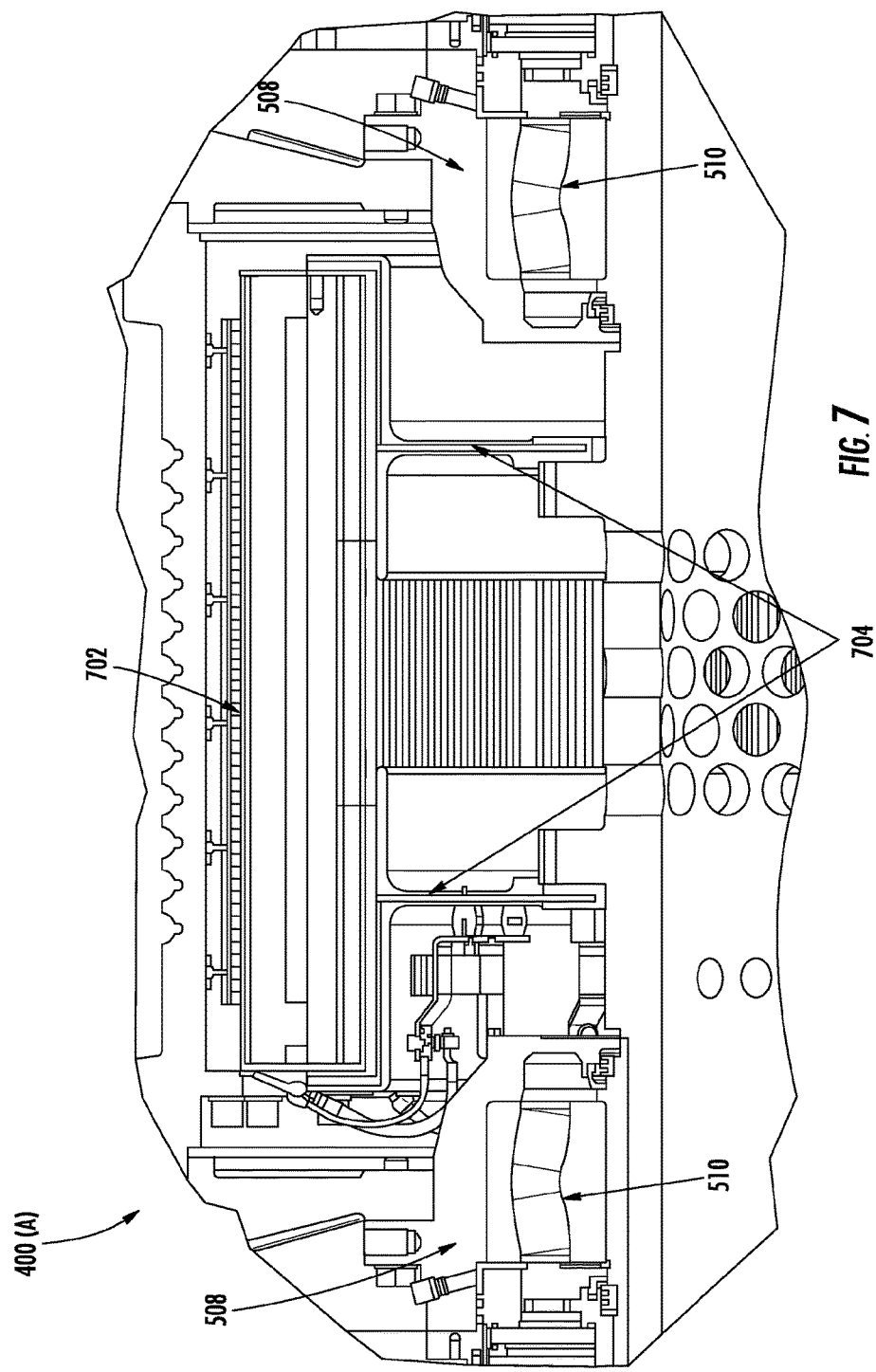
FIG. 7 illustrates a portion of the machine of FIG. 4.

Referring now to FIG. 7, the portion 'A' of the machine 400 is shown with additional details not shown in FIG. 6. Specifically, as shown in FIG. 7, the machine 400 may include a stator assembly 702. The stator assembly 702 may include a support hub with motor laminations and windings attached to an outside diameter.

The stator assembly 702 may be supported by flexible plates 704 on both ends of the stator assembly 702. A closer view of the plates 704 is shown in FIGS. 8A-8D. The thickness and/or geometry of the plates 704 may allow the stator 504 or stator assembly 702 to expand radially and/or axially in a uniform manner without subjecting components of the stator 504 to unnecessary strain or stress. The dimensions or thickness of the plates 704 may be selected based on simulation. A bigger or larger diameter for the stator or shaft may enable thicker walls to be used for the plates 704.

Figure 8A:
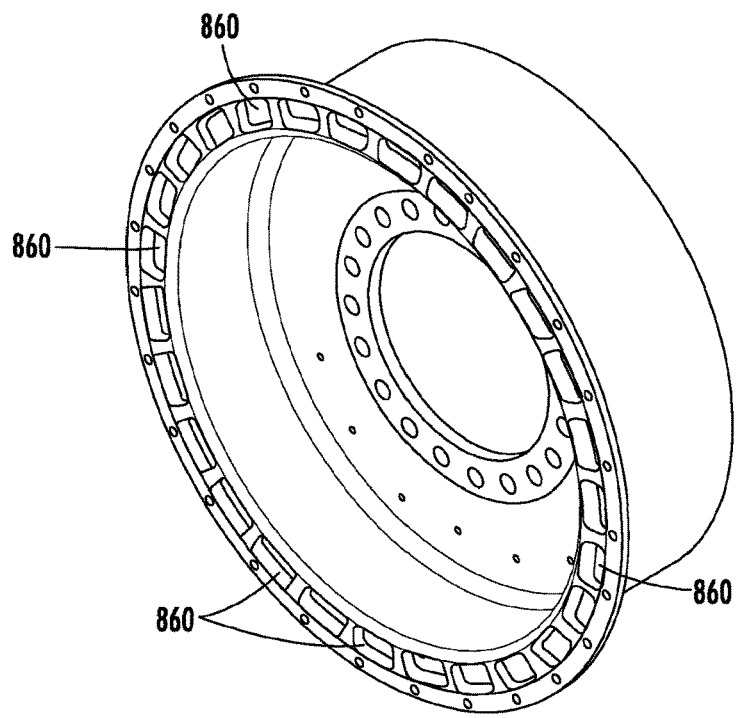
FIGS. 8A-8B illustrate exemplary support plates.
Figure 8B:
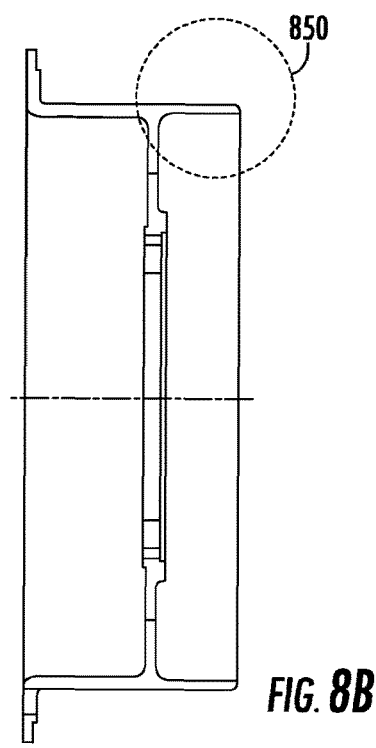
Figure 8C:
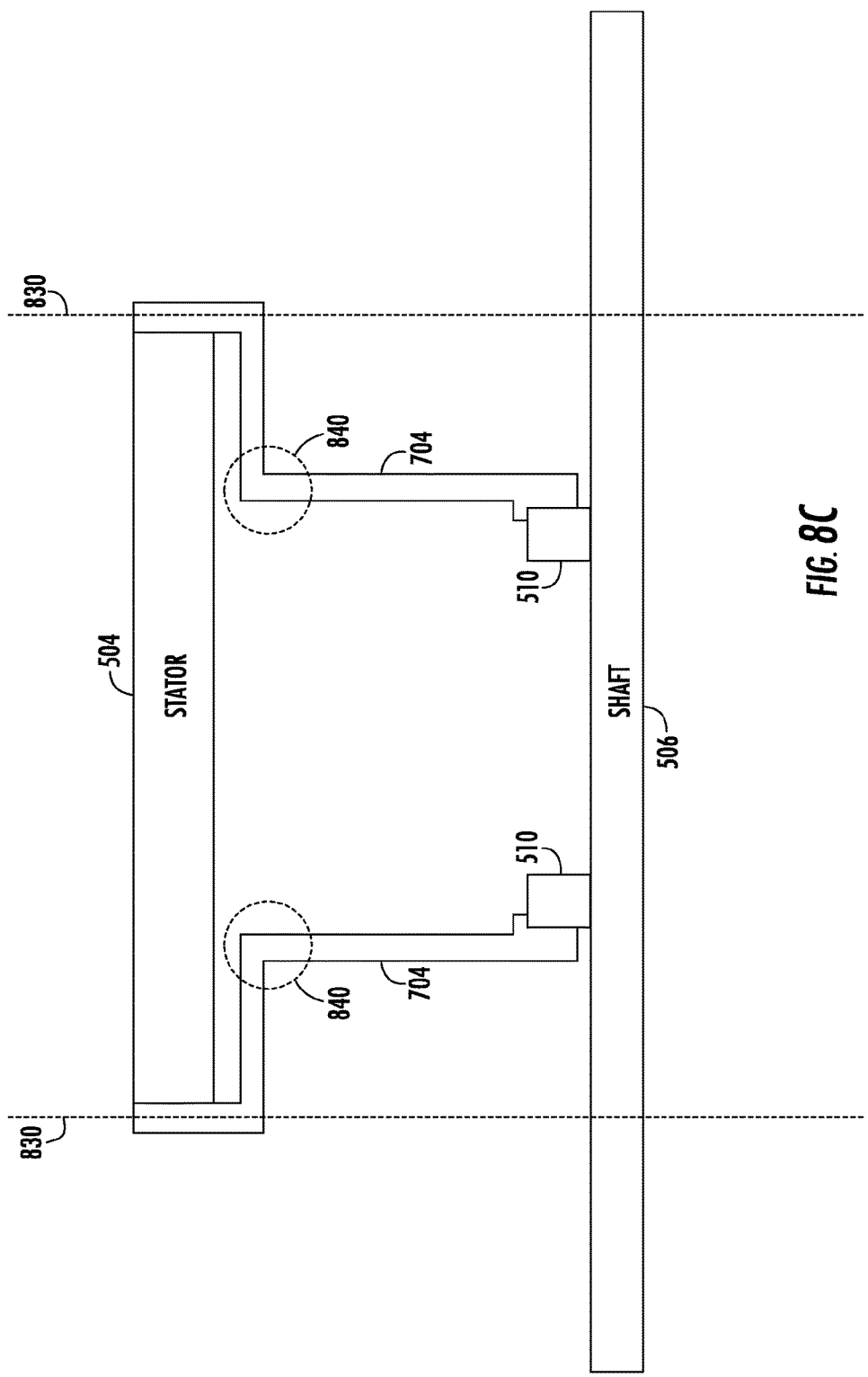
FIGS. 8C-8D illustrate exemplary embodiments of support plates coupling a stator and a shaft.

The plates 704 may be shaped to allow the machine bearings (e.g., bearing 510) to be partially or completely recessed within an envelope 830 of the stator 504 or sheave 410. For example, as shown in FIG. 8C, the plates 704 may include an angle 840 to facilitate coupling the stator 504 and the shaft 506 (via the bearings 510). The angle 840 may be a substantially right angle. The angle 840 may have a range associated with it, such as being between seventy degrees and one-hundred ten degrees.

To allow for the flexibility of the plate 704, the angle 840 may be located such that the stator (e.g., stator 504) is allowed to expand. Such expansion (or contraction) may occur over a range of temperatures. The location of the angle 840 may be based on one or more factors or considerations. For example, the location of the angle 840 may be selected based on a provisioning of one or more cooling mechanisms or holes, a size or thickness of one or more flanges that may be used to transmit torque, etc.

Figure 8D:
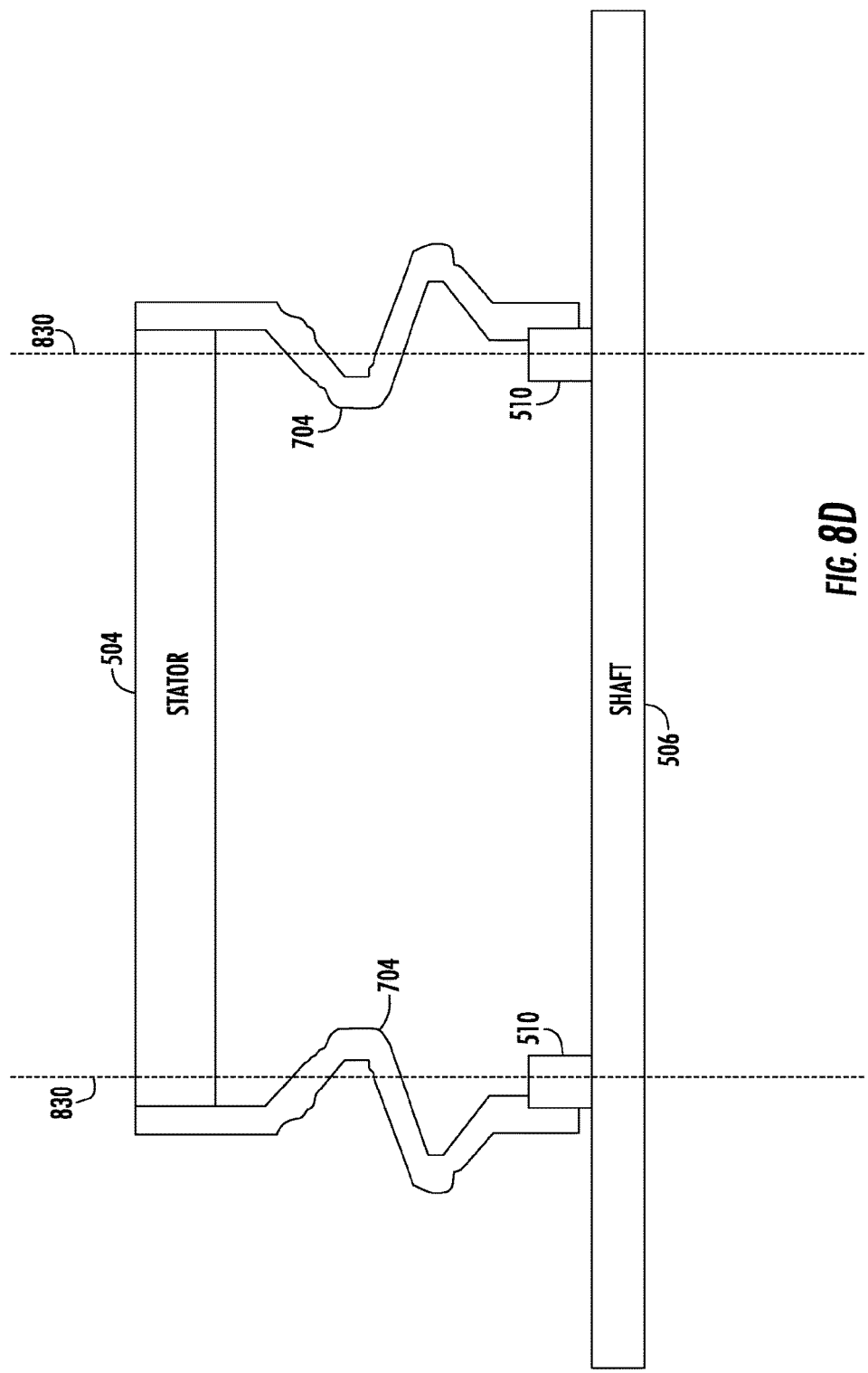

As shown in FIG. 8D, in some embodiments the bearings might not be recessed within the envelope 830. Also, the plates 704 are shaped like a coil or snake. Much like the embodiment of FIG. 8C, the embodiment of FIG. 8D may allow for a reduction of stress in the stator 504 during thermal expansion by allowing the stator 504 to expand substantially uniformly in the radial and axial directions.

The plates 704 may be constructed of one or more materials. For example, one or more metals may be used. The plates 704 may be constructed of aluminum, ductile iron, steel, an iron-based alloy, etc.

The plates 704 may be configured to include a cylindrical extension 850 toward the center of the stator assembly to guide cooling air over heat sink fins. Windows 860 in the support plates 704 may allow for cooling air to exit the stator assembly 702.

Figure 9:
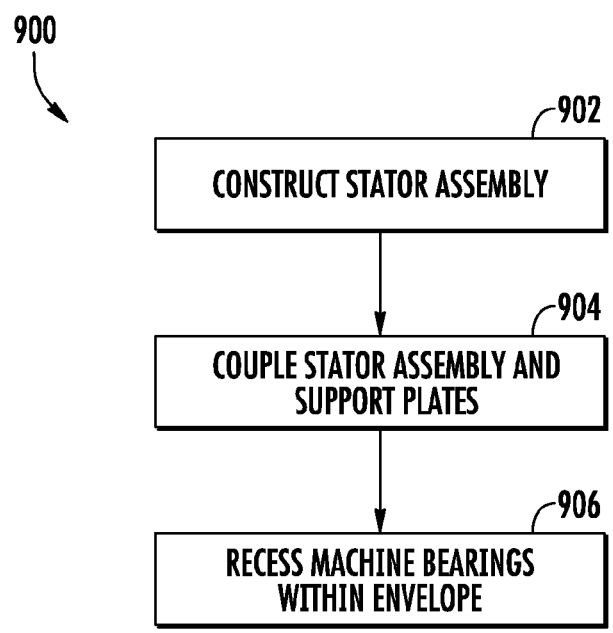
FIG. 9 illustrates a flow chart of an exemplary method in accordance with one or more embodiments of the disclosure.

Turning now to FIG. 9, a flow chart of an exemplary method 900 is shown. The method 900 may be used to design, manufacture, or modernize a machine for an elevator. For example, the method 900 may be used to reduce the size or dimensions of the machine, allowing the machine to fit within, e.g., a smaller machine room.

In block 902, a stator (e.g., stator 504) or stator assembly (e.g., stator assembly 702) may be constructed. The stator/stator assembly may include one or more of the entities or components, such as those described herein.

In block 904, the stator assembly constructed in block 902 may be coupled with one or more plates (e.g., plates 704). The plates may be used to provide support for the stator assembly and may be used to reliably connect the stator assembly to a shaft over a range of temperatures. As part of block 904, a shape or geometry for the plates may be selected to achieve one or more features, such as those described herein. The plates may be constructed in accordance with one or more specifications. The specifications may include details regarding the thickness, geometry, shape, and/or material for the plates.

In block 906, bearings associated with the machine may be recessed within an envelope of a stator/stator assembly or a sheave associated with the machine. As part of block 906, the envelope may be established.

The method 900 is illustrative. In some embodiments, one or more of the blocks or operations (or portions thereof) may be optional. In some embodiments, the operations may execute in an order or sequence different from what is shown. In some embodiments, one or more additional operations not shown may be included.

Embodiments of the disclosure may provide for a number of technical effects and benefits. For example, stator end plate design may allow for bearings to be at least partially recessed within an envelope of a sheave, thereby reducing the overall size or length of a machine. Stator end plate design and flexibility may reduce the stress imposed on a stator due to or during thermal expansion, thereby enhancing motor reliability and extending operational life of the motor.

In some embodiments, an external rotor design and stator end plate design may allow a motor airgap to decrease uniformly as temperature increases. Accordingly, high temperature operating efficiency may be improved compared to convention internal rotor motors. The risk of motor noise may be reduced as well due to the uniformity of the airgap under elevated temperature conditions.

In some embodiments, integrated air deflectors may be used to eliminate extra parts and connections, thereby improving reliability and cost.

In some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional.

What is claimed is:

1. An elevator machine comprising:
   a stator assembly; and
   a plurality of support plates coupled to the stator assembly, wherein a respective at least one of the support plates is coupled on each end of the stator assembly;
   wherein each of the support plates comprises an angled portion in a range from seventy degrees to one-hundred ten degrees;

wherein each of the support plates comprises a first end having a bearing mounted at the first end and a second end supporting the stator assembly;

wherein the angled portion is located between the first end and the second end, the angled portion configured to enable the stator assembly to expand radially and axially in a substantially uniform manner over a range of temperatures.

2. The elevator machine of claim 1, wherein each of the support plates is made of at least one of: aluminum, ductile iron, steel, and an iron-based alloy.

3. The elevator machine of claim 1, wherein the angled portion of each of the support plates comprises a substantially right angle.

4. The elevator machine of claim 1, wherein at least one of the support plates comprises a cylindrical extension toward a center of the stator assembly configured to guide cooling air over heat sink fins.

5. The elevator machine of claim 1, wherein at least one of the support plates comprises at least one window configured to allow cooling air to exit the stator assembly.

6. The elevator machine of claim 1, further comprising:
a sheave;
a plurality of bearings included within respective housings and recessed at least partially within an envelope of the sheave and stator assembly.

7. The elevator machine of claim 6, further comprising:
an external rotor motor located within the envelope of the sheave.

\* \* \* \* \*